United States Patent [19]
Bach et al.

[11] 3,880,856
[45] Apr. 29, 1975

[54] ERGOLINE DIMERS
[75] Inventors: Nicholas J. Bach; Edmund C. Kornfeld, both of Indianapolis, Ind.
[73] Assignee: Eli Lilly and Company, Indianapolis, Ind.
[22] Filed: June 29, 1973
[21] Appl. No.: 375,212

[52] U.S. Cl................................ 260/285.5; 424/261
[51] Int. Cl............................................ C07d 43/20
[58] Field of Search.................................. 260/285.5

[56] References Cited
OTHER PUBLICATIONS
Morrocchi et al., Chemical Abstracts, Vol. 69, 77248u, 1968.
Kabbe et al., Chemical Abstracts, Vol. 74, 141018b, 1971.

*Primary Examiner*—Donald G. Daus
*Assistant Examiner*—Mary C. Vaughn
*Attorney, Agent, or Firm*—James L. Rowe; Everet F. Smith

[57] ABSTRACT

Substituted ergolines are dimerized under acidic conditions to yield compounds useful as sunscreen agents.

7 Claims, No Drawings

ERGOLINE DIMERS

BACKGROUND OF THE INVENTION

Compounds based on the ergoline ring system:

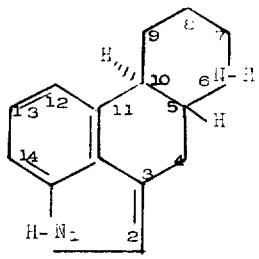

have a surprising variety of pharmaceutical activities. For example, lysergic and isolysergic acid are 8-carboxy-6-methyl-$\Delta^9$-ergolines. The amides of lysergic acid, many of which have valuable and unique pharmacologic properties, include the naturally occurring oxytocic alkaloids — ergocornine, ergokryptine, ergonovine, ergocristine, ergosine, ergotamine etc. — and synthetic oxytocics such as methergine as well as the synthetic hallucinogen - lysergic acid diethylamide or LSD. The amides of 6-methyl-8-carboxyergoline, known generically as dihydroergot alkaloids, are oxytocic agents of lower potency and also lower toxicity than the ergot alkaloids themselves. Recently, it has been found by Clemens, Semonsky, Meites, and their various coworkers that many ergot-related drugs have activity as prolactin inhibitors including ergocornine, dihydroergocorine, 2-bromo-α-ergokryptine and d-6-methyl-8-cyanomethylergoline. References embodying some of the newer findings in the field of ergoline chemistry are the following: Nagasawa and Meites, *Proc. Soc. Exp. Biol. Med*, 135, 469 (1970); Lutterbeck et al., *Brit. Med. J.*, 228, (July, 24, 1971); Heuson et al., *Europ. J. Cancer*, 353 (1970); *Coll. Czech. Chem. Commun.*, 33, 577 (1968); *Nature*, 221, 666 (1969); Seda et al., *J. Reprod. Fert.*, 24, 263 (1971); Mantle and Finn, id, 441; Semonsky and co-workers, *Coll. Czech. Chem. Comm.*, 36, 2200 (1971); Schaar and Clemens, *Endocr.*, 90, 285-8 (1972); and Clemens and Schaar, *Proc. Soc. Exp. Biol Med.*, 139, 659-662 (1972). Recently issued patents in the field of ergoline derivatives or lysergic acid derivatives include the following: U.S. Pat. No. 3,704,233, U.S. Pat. No. 3,709,891, U.S. Pat. No. 3,585,201, U.S. Pat. No. 3,666,762, U.S. Pat. No. 3,586,683, U.S. Pat. No. 3,717,640, and U.S. Pat. No. 3,592,816.

No instance of dimeric ergoline compounds has been found in the prior art.

SUMMARY OF THE INVENTION

This invention provides dimeric ergoline compounds of the formula

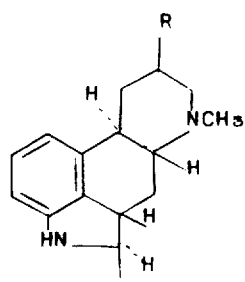

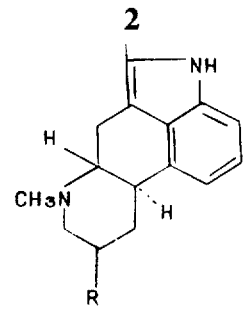

I and the $\Delta^{7(8)}$, $\Delta^{8(9)}$ and $\Delta^{9(10)}$ derivatives thereof wherein R is carbo-lower-alkoxy, lower alkyl, chloromethyl, hydroxymethyl, cyanomethyl, and N-carboxamido methyl

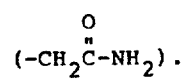

In the above formula when R is carbo-lower-alkoxy, it represents such groups as carbomethoxy, carboethoxy, carbo-n-propoxy, and carboisopropoxy. When R is lower alkly it can be methyl, ethyl, n-propyl or isopropyl.

Compounds according to the above formula are prepared from the corresponding monomer

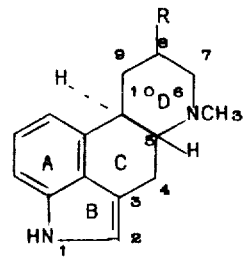

II or the $\Delta^{7(8)}$, $\Delta^{8(9)}$ and $\Delta^{9(10)}$ derivatives thereof wherein R has the same meaning as above. The 6-methyl ergolines and the $\Delta^{7(8)}$, $\Delta^{8(9)}$ and $\Delta^{9(10)}$ derivatives thereof represented by Formula II upon treatment with acid are smoothly converted to the corresponding dimer of Formula I. The dimeric products produced thereby are isolated from the reaction mixture by routine chemical procedures. Acids useful in causing the dimerization include Lewis acids of the type, phosphorusoxychloride, trifluoroacetic acid, boron trifluoride etherate, phosphorus pentachloride, polyphosphoric acid and the like.

The compounds of this invention absorb ultra violet light in the region from about 200 μ to 300 μ. As such they are useful as sun screen agents in that they will protect fabrics and the like from harmful effects of ultraviolet radiation when incorporated thereon as a surface coating. For example, the dimer from $\Delta^{7(8)}$-6-methyl-8-carbomethoxyergoline absorbs ultraviolet light strongly in the region from 200-230 μ and from 280-310 μ with peak absorption at 295 μ. The dimer prepared from the corresponding $\Delta^{9(10)}$- ergoline has a marked ultraviolet absorption in the region 260-230 μ. The dimer prepared from $\Delta^{8(9)}$ - 6,8-dimethylergoline absorbs ultraviolet light chiefly in the region 200–230 μ as does the dimer prepared from 6-methyl-8-cyanomethylergoline. The compounds are in general soluble in polar organic solvents such as the lower alcohols and can be applied to the surface to be protected from the harmful effects of ultraviolet radiation as an alcoholic solution.

The preparation of the compounds of this invention is illustrated by the following specific example.

EXAMPLE

About 5 ml. of boron trifluoride etherate were added to a solution of 0.9 g. of methyl 9,10-dihydrolysergate in 25 ml. of trifluoroacetic acid. The mixture was stirred at room temperature for about 30 minutes. The reaction mixture was diluted with water. Sufficient 14 N ammonium hydroxide was added to neutralize the acid present, and the reaction product, the dimer of methyl 9,10-dihydrolysergate, was extracted therefrom by ethyl acetate. The ethyl acetate extract was separated, washed with water, dried and the solvent removed by evaporation in vacuo. Crystallization of the residual dimeric product from methanol yielded the dimer of methyl 9,10-dihydrolysergate (formula I above in which R is carbomethoxy) which melted at about 242°–245° C. with decomposition after recrystallization from methanol.

Analysis Calc. for $C_{34}H_{40}N_4O_4$:
Requires: C, 71.81; H, 7.09; N, 9.85;
Found: C, 71.64; H, 7.19; N, 9.98.

Other compounds prepared by the above procedure include the following:

Dimer prepared from $\Delta^{9(10)}$-6-methyl-8-carbomethoxyergoline (Formula I wherein R is carbomethoxy and with a double bond between the 9 and 10 positions) not crystallineanalytical sample precipitated from ether-hexane; mp. slow dec > 150° C.

Analysis
calc: C, 72.32; H 6.43; N, 9.92; O, 11.33.
Found: C, 72.48; H, 6.55; N, 9.98; O, 11.26.

The dimer prepared from $\Delta^{7(8)}$-6-methyl-8-carbomethoxyergoline (Formula I having a double bond between the 7 and 8 carbons and a carbomethoxy group at 8). Not crystallineanalytical sample precipitated from ether-hexane; infra red, ultraviolet, molecular ion and nmr spectra all support the projected structure.

Analysis calc:
C, 72.32; H, 6.43; N, 9.92; O, 11.33.
Found: C, 71.39; H, 6.85; N, 9.34; O, 11.91.

The dimer from $\Delta^{9(9)}$ -6,8-dimethylergoline (Formula I which R is metyl and there is a double bond between the 8 and 9 carbons) not crystalline-analytical sample precipitated from ether-hexane mp=slow dec > 150° C.

Analysis
calc: C, 80.63; H, 7.61; N, 11.75;
Found: C, 80.80; H, 7.73; N, 12.03.

The dimer from 6-methyl-8-hydroxymethylergoline (Formula I in which R is —$CH_2OH$). The dimer from 6-methyl-8-cyanomethylergoline (formula I wherein R is $CH_2CN$) crystallized from methanol; mp=226°–8° dec. Infra-red, ultraviolet, molecular ion and nmr spectra support the postulated structure.

Analysis
calc: C, 76.95; H, 7.27; N, 15.84;
Found: C, 75.28; H, 6.82; N, 15.26.

The dimer from 6-methyl-8-chloromethylergoline (Formula I wherein R is $CH_2Cl$); crystallized from methanol; mp=slow dec > 175°C.

Analysis
calc: C, 69.93; H, 6.97; N, 10.19; Cl, 12.90;
Found: C, 69.72; H, 6.74; N, 10.24; Cl, 13.00.

Other compounds preparable by the above procedure include the dimer from 6-methyl-8-carboxamidomethylergoline (Formula I wherein R is

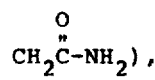

the dimer from 6methyl-8-ethylergoline (Formula I wherein R is ethyl); the dimer from $\Delta^{9(10)}$-6-methyl-8-n-propylergoline (Formula I wherein R is n-propyl and there is a double bond between the 9 and 10 carbon atoms); the dimer from $66^{9(10)}$-6-methyl-8-carboethoxyergoline (Formula I wherein R is carboethoxy and there is a double bond between the 9 and 10 carbon atoms); the dimer from 6-methyl-8-carboisopropoxyergoline (Formula I wherein R is carboisopropoxy); the dimer from $\Delta^{7(8)}$-6-methyl-8-chloromethylergoline (Formula I wherein R is $CH_2Cl$ and there is a double bond between the 7 and 8 carbon atoms); the dimer from other $\Delta^{7(8)}$ -ergolines can be prepared from the corresponding 8-substituted ergoline derivative by the above procedure.

The starting materials useful in preparing the monomers of formula II above are well known where the formula discloses ergolines (dihydrolysergic acid structure) and their $\Delta^{8(9)}$ and $\Delta^{9(10)}$ derivatives. The $\Delta^{7(8)}$ ergolines are, however, new compounds and are prepared readily according to the following procedure in which the preparation of $\Delta^{7(8)}$ -1-isopropyl-6-methyl-8-carbomethoxyergoline is exemplified. In the procedure, an N-oxide is formed on the $C_6$ nitrogen by means of peroxybenzoic acid. Decomposition of the N-oxide by triethylamine followed by acetic anhydride yields the desired $\Delta^{7(8)}$ derivative.

A solution of 3.26 g. of methyl 1-isopropyl dihydrolysergate was prepared in 50 ml. of chloroform. A second solution containing 2.10 g. of m-chloroperbenzoic acid in 35 ml. of chloroform was added in dropwise fashion over a 20 minute period. The mixture was stirred for about one half a hour and then 2.0 ml. of triethylamine were added followerd by the dropwise addition of 15 ml. of acetic anhydride over a 20 minute period. The temperature of the reaction mixture rose to about 40° C. The reaction mixture was stirred for one-half hour further after which time 50 ml. of water were added followed by an excess of 14 N aqueous ammonium hydroxide. $\Delta^{7(8)}$ -1-isopropyl-6-methyl-8-carbomethoxyergoline residue which readily crystallized from methanol. $\Delta^{7(8)}$ -1-isopropyl-6-methyl-8-carbomethoxyergoline thus prepared melted at about 182°–3° C. $\Delta^{7(8)}$ -ergolines without a substituent an the indole nitrogen are prepared similarly.

We claim:
1. A compound according to the following formula

5

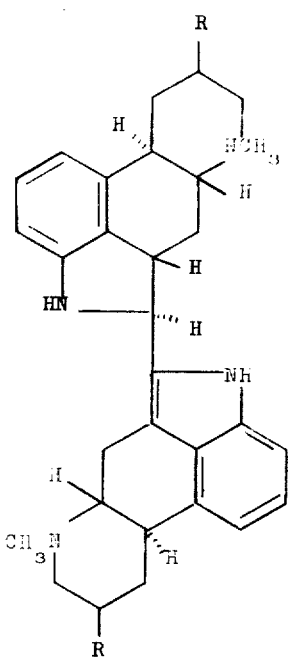

wherein R is carbomethoxy, carboethoxy, carbo-n-propoxy, carboisopropoxy, methyl, ethyl, n-propyl, isopropyl, hydroxymethyl, chloromethyl, or cyanomethyl, and the $\Delta^{7(8)}$, $\Delta^{8(9)}$, and $\Delta^{9(10)}$ derivatives thereof.

2. Compound according to claim 1, said compound being the dimer from $\Delta^{7(8)}$-6-methyl-8-carbomethoxyergoline.

3. Compound according to claim 1, said compound being the dimer from $\Delta^{9(10)}$-6-methyl-8-carbomethoxyergoline.

4. A compound according to claim 1, said compound being the dimer from $\Delta^{8(9)}$-6,8-dimethylergoline.

5. A compound according to claim 1, said compound being the dimer from 6-methyl-8-cyanomethylergoline.

6. The process of preparing a compound of the following structure or $\Delta^{7(8)}$, $\Delta 8(9)$, and $\Delta^{9(10)}$ derivatives thereof

6

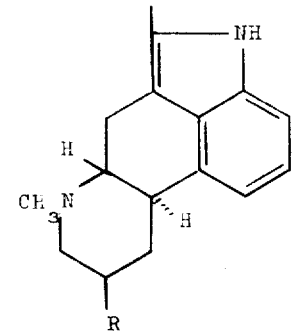

wherein R is carbomethoxy, carboethoxy, carbo-n-propoxy, carboisopropoxy, methyl, ethyl, n-propyl, isopropyl, hydroxymethyl, chloromethyl, or cyanomethyl which comprises the steps of reacting a compound of the structure or $\Delta^{7(8)}$, $\Delta 8(9)$, and $\Delta 9(10)$ derivatives thereof wherein R is carbomethoxy, carboethoxy, carbo-n-propoxy, carboisopropoxy, methyl, ethyl, n-propyl, isopropyl, hydroxymethyl, chloromethyl, or cyanomethyl with a Lewis acid.

7. The process according to claim 6 wherein the Lewis acid is borontrifluoride etherate in trifluoroacetic acid.

* * * * *